United States Patent
Zheng et al.

(10) Patent No.: US 12,528,943 B2
(45) Date of Patent: Jan. 20, 2026

(54) REACTIVE DISPERSE YELLOW DYE FOR SUPERCRITICAL $CO_2$ DYEING AND METHODS OF PRODUCTION AND USE THEREOF

(71) Applicants: Dalian Polytechnic University, Liaoning (CN); Dalian Supercritical Waterless Printing and Dyeing Technology Co., Ltd, Liaoning (CN)

(72) Inventors: Huanda Zheng, Liaoning (CN); Laijiu Zheng, Liaoning (CN); Youcai Guo, Liaoning (CN)

(73) Assignees: Dalian Polytechnic University, Liaoning (CN); Dalian Supercritical Waterless Printing and Dyeing Technology Co., Ltd, Liaoning (CN)

( * ) Notice: Subject to any disclaimer, the term of this patent is extended or adjusted under 35 U.S.C. 154(b) by 699 days.

(21) Appl. No.: 18/055,075

(22) Filed: Nov. 14, 2022

(65) Prior Publication Data
US 2023/0151218 A1    May 18, 2023

(30) Foreign Application Priority Data
Nov. 12, 2021  (CN) .......................... 202111342949.6

(51) Int. Cl.
| | | |
|---|---|---|
| *C09B 43/08* | (2006.01) | |
| *C09B 67/54* | (2006.01) | |
| *D06P 1/18* | (2006.01) | |
| *D06P 3/22* | (2006.01) | |
| *D06P 3/56* | (2006.01) | |
| *D06P 3/68* | (2006.01) | |
| *D06P 3/82* | (2006.01) | |

(52) U.S. Cl.
CPC ........ *C09B 43/085* (2013.01); *C09B 67/0096* (2013.01); *D06P 1/18* (2013.01); *D06P 3/22* (2013.01); *D06P 3/56* (2013.01); *D06P 3/68* (2013.01); *D06P 3/8223* (2013.01); *D10B 2401/14* (2013.01)

(58) Field of Classification Search
CPC . C09B 43/085; C09B 67/0096; C09B 62/085; D06P 1/18; D06P 3/22; D06P 3/56; D06P 3/68; D06P 3/8223; D06P 1/382; D06P 1/94; D06P 3/528; D06P 3/6033; D06P 3/663; D06P 3/54; D06P 3/8233; D06P 3/043; D06P 3/10; D06P 3/6041; D10B 2401/14; Y02P 20/54
See application file for complete search history.

(56) References Cited

FOREIGN PATENT DOCUMENTS

CN    103194090    *    7/2013    ........... C09B 62/085

* cited by examiner

*Primary Examiner* — Robert H Havlin
(74) *Attorney, Agent, or Firm* — NKL Law; Allen Xue (57) ABSTRACT

A reactive disperse yellow dye is suitable for supercritical $CO_2$ anhydrous dyeing. The reactive disperse yellow dye in has a parent of azo structure, and has monochlorometriazinyl groups thereon. The reactive disperse yellow dye can be used for supercritical $CO_2$ anhydrous dyeing of cellulose fiber, protein fiber, chemical fiber and the blended fabrics thereof, and has good dyeing effect particularly for cotton-polyester blended products.

10 Claims, 6 Drawing Sheets

REACTIVE DISPERSE YELLOW DYE FOR SUPERCRITICAL CO₂ DYEING AND METHODS OF PRODUCTION AND USE THEREOF

TECHNICAL FIELD

The present disclosure relates to a reactive disperse dye for supercritical $CO_2$ anhydrous dyeing and a preparation method thereof, belonging to the technical field of dye synthesis.

BACKGROUND

In the supercritical state, $CO_2$ has a viscosity similar to that of gas and a density similar to that of liquid, showing a high diffusivity to the matrix and a strong solubility to low polarity substances, which makes it of great application value in the field of textile dyeing and finishing. It is found that by using supercritical $CO_2$ fluid to dissolve low polarity dyes to dye textile materials, dyes without adding aqueous medium can fast dye fibers with high dye-uptake. After completion of dyeing, water washing and drying processes can be omitted, significantly shortening the dyeing process and reduces production energy consumption. And, unfinished dyes can be separated from $CO_2$ fluid through phase transition in separation device, thus the dyes and $CO_2$ can be recycled, showing characteristics of zero-emission and pollution-free dyeing. Therefore, supercritical $CO_2$ fluid dyeing, as a potential technology alternative to traditional aqueous medium dyeing technology, has been widely concerned by scholars at home and abroad.

After years of development, the engineering anhydrous dyeing procedure for polyester in supercritical $CO_2$ has been accelerated, having obvious advantages in water saving and energy saving. However, the color fastness is poor due to the very small force between polarity natural fibers and disperse dyes in the process of natural fiber dyeing in supercritical $CO_2$ fluid. Direct dyes, acid dyes and reactive dyes commonly used in natural fibers are hardly soluble in supercritical $CO_2$. Developing special dyes for supercritical $CO_2$ dyeing suitable for natural fibers such as cotton, linen and wool, and expending the application scope of this technology are the key to the research of supercritical $CO_2$ anhydrous dyeing technology at present. Especially for blended materials including cotton-polyester, there is no report on dyes suitable for supercritical $CO_2$ anhydrous dyeing.

SUMMARY OF THE INVENTION

In order to solve the above problems, the present disclosure provides an azo reactive disperse yellow dye suitable for supercritical $CO_2$ anhydrous dyeing, and preparation method and use thereof. The reactive group monochlorotriazinyl in the structure of the dye can meet the reaction coloring requirements of natural fiber. The aniline in the structure of the dye improves the directness and solubility of the dye, meeting the dyeing requirements of chemical fibers including polyester.

It's an object of the present disclosure to provide a reactive disperse yellow dyes having a structural according to formula I:

wherein R is $C_2H_5$ or $C_3H_7$.

It's another object of the present disclosure to provide a method for preparing the said reactive disperse yellow dye, including the following steps of:

S1. dissolving N, N-dimethyl disperse dye II in a mixed solution of dioxane and water to obtain a N, N-dimethyl disperse dye II solution; dissolving cyanuric chloride in dioxane to obtain a mixture, followed by dropwise adding the mixture into the N, N-dimethyl disperse dye II solution, adjusting the solution's pH to 7 and conducting a reaction in an ice bath for 2 to 4 hours; after completion of the reaction, filtering a product, removing a solvent from the product, drying the product, and separating and purifying the product to obtain a N, N-dimethyl-s-triazine reactive disperse dye A;

The N, N-dimethyl disperse dye II has a structural according to formula II:

The N, N-dimethyl-s-triazine reactive disperse dye A has a structural according to formula A:

S2. dissolving the N, N-dimethyl-s-triazine reactive disperse dye A obtained in step S1 in a mixed solution of dioxane and water to obtain a N, N-dimethyl-s-triazine reactive disperse dye A solution; dissolving 4-ethylaniline or 4-propylaniline in dioxane to obtain a mixture, followed by dropwise adding the mixture into the N, N-dimethyl-s-triazine reactive disperse dye A solution, adjusting the solution's pH to 7 and conducting a reaction for 2.5 to 4.5 hours at 60 to 65° C.; after completion of the reaction, filtering a product, removing a solvent from the product, drying the product, and separating and purifying the product to obtain the reactive disperse yellow dye.

When R is $C_2H_5$, the reactive disperse yellow dye is 2-chloro-4-ethylaniline-s-triazine reactive disperse dye. When R is $C_3H_7$, the reactive disperse yellow dye is 2-chloro-4-propylaniline-s-triazine reactive disperse dye.

Preferably, the N, N-dimethyl-s-triazine reactive disperse dye A obtained in step S1 is dissolved in a mixed solution of dioxane and water to obtain a N, N-dimethyl-s-triazine reactive disperse dye A solution; 4-ethylaniline is dissolved in dioxane to obtain a mixture, followed by dropwise adding the mixture into the N, N-dimethyl-s-triazine reactive disperse dye A solution, and the solution's pH is adjusted to 7 and a reaction is conducted for 2.5 to 4.5 hours at 60 to 65° C.; after completion of the reaction, a product is filtered, a solvent is removed from the product, and the product is dried, and then is conducted a separation and purification to obtain the 2-chloro-4-ethylaniline-s-triazine reactive disperse dye.

Preferably, the N, N-dimethyl-s-triazine reactive disperse dye A obtained in step S1 is dissolved in a mixed solution of dioxane and water to obtain a N, N-dimethyl-s-triazine reactive disperse dye A solution; 4-propylaniline is dissolved in dioxane to obtain a mixture, followed by dropwise adding the mixture into the N, N-dimethyl-s-triazine reactive disperse dye A solution, and the solution's pH is adjusted to 7 and a reaction is conducted for 2.5 to 4.5 hours at 60 to 65° C.; after completion of the reaction, a product is filtered, a solvent is removed from the product, and the product is dried, and then is conducted a separation and purification to obtain the 2-chloro-4-propylaniline-s-triazine reactive disperse dye.

Further, in step S1, a molar ratio of the N, N-dimethyl disperse dye and the cyanuric is 1:1 to 1:3. In step S2, a molar ratio of the N, N-dimethyl-s-triazine reactive disperse dye and 4-ethylaniline is 1:0.5 to 1:2, and a molar ratio of the N, N-dimethyl-s-triazine reactive disperse dye and 4-propylaniline is 1:0.5 to 1:2.

Further, in steps S1 and S2, a volume ratio of dioxane and water in the mixed solution of dioxane and water is 3:1.

Further, in steps S1 and S2, a method for removing the solvent is rotary evaporation.

Further, in steps S1 and S2, the drying is conducted at 60 to 80° C. for 12 hours.

Further, in steps S1 and S2, sodium carbonate is used to adjust the pH to 7. In steps S1 and S2, the o separation and purification is to recrystallize the product by N, N-dimethylformamide.

The present disclosure also provides a use of the said reactive disperse yellow dye in supercritical $CO_2$ anhydrous dyeing. The reactive dispersive yellow dye is used to dye a textile to-be-dyed by using supercritical $CO_2$ fluid as a dyeing medium.

Further, 1 to 4% (o.w.f) of the reactive disperse yellow dye is added into a dye kettle and the textile to-be-dyed is placed into a dyeing kettle to dye for 40 to 120 minutes at 80 to 140° C. under 16 to 26 MPa.

Further, the textile to-be-dyed is selected from a group of cellulose fiber, protein fiber and chemical fiber, or is a blended fabric formed by at least two of the group. The cellulose fiber is cotton fiber or fibrilia, the protein fiber is wool fiber, and the chemical fiber is polyester. The blended fabric is cotton-polyester blended fabric. The reactive disperse yellow dye has good dyeing effect for cotton-polyester blended products.

Compared with the prior art, the present disclosure has the following beneficial effects:

The reactive disperse yellow dye provided by the present disclosure has a simple structure. The reactive group monochlorometriazinyl in the structure of the dye has a high reactivity, which can meet the reaction coloring requirements of natural fibers including cotton, fibrilia and wool. The aniline in the structure of the dye improves the directness and solubility of the dye, which can meet the dyeing requirements of polyester and other chemical fibers. The reactive disperse yellow dye has good dyeing performance for blended fiber materials including cotton-polyester. The color fastness to washing and color fastness to rubbing of dyed products can reach above 4 to 5.

DETAILED DESCRIPTION OF DRAWINGS

Figure 1:
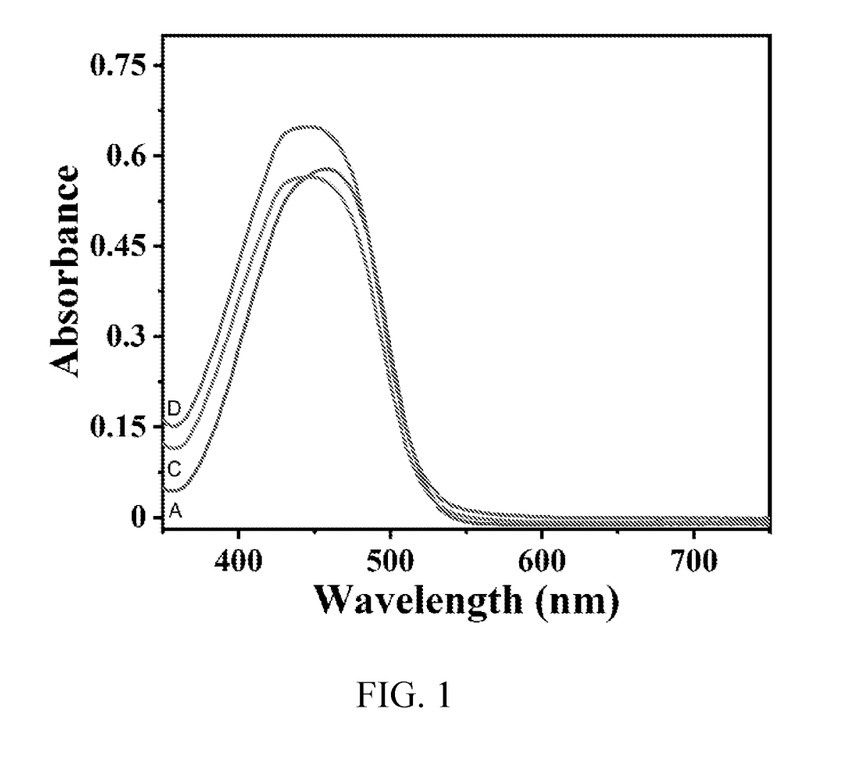
FIG. 1 shows the UV absorption spectrum of the dye A, dye C and dye D.
Figure 2:
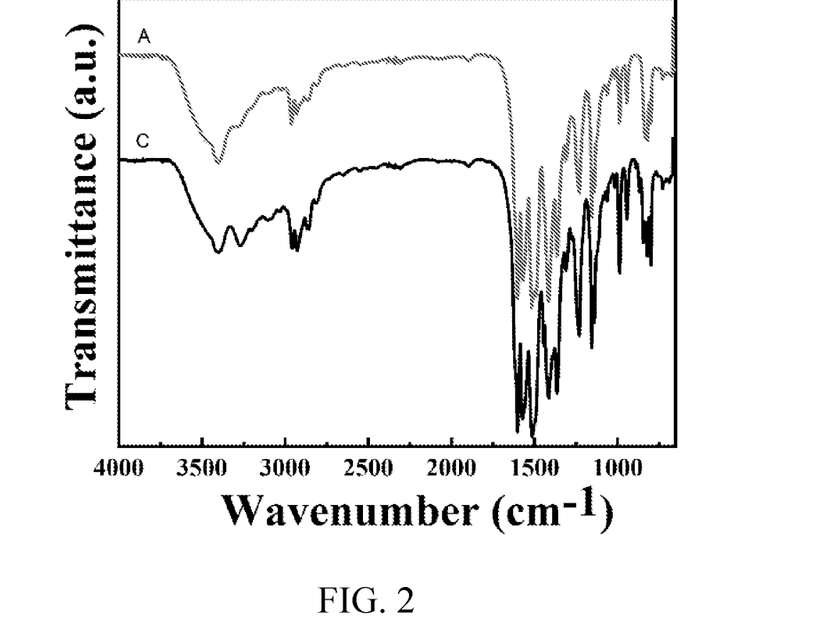
FIG. 2 shows the infrared spectrum of the dye A and dye C.
Figure 3:
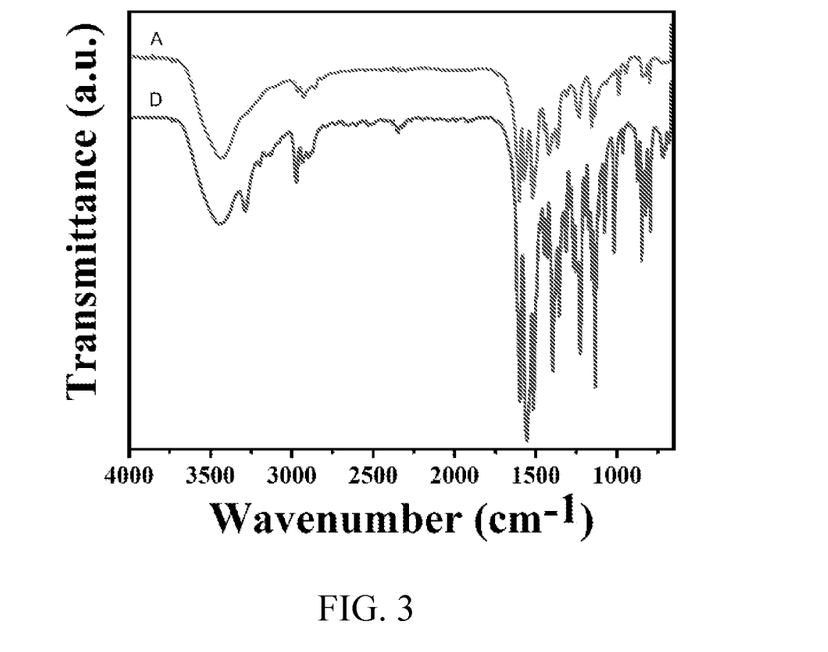
FIG. 3 shows the infrared spectrum of the dye A and dye D.
Figure 4:
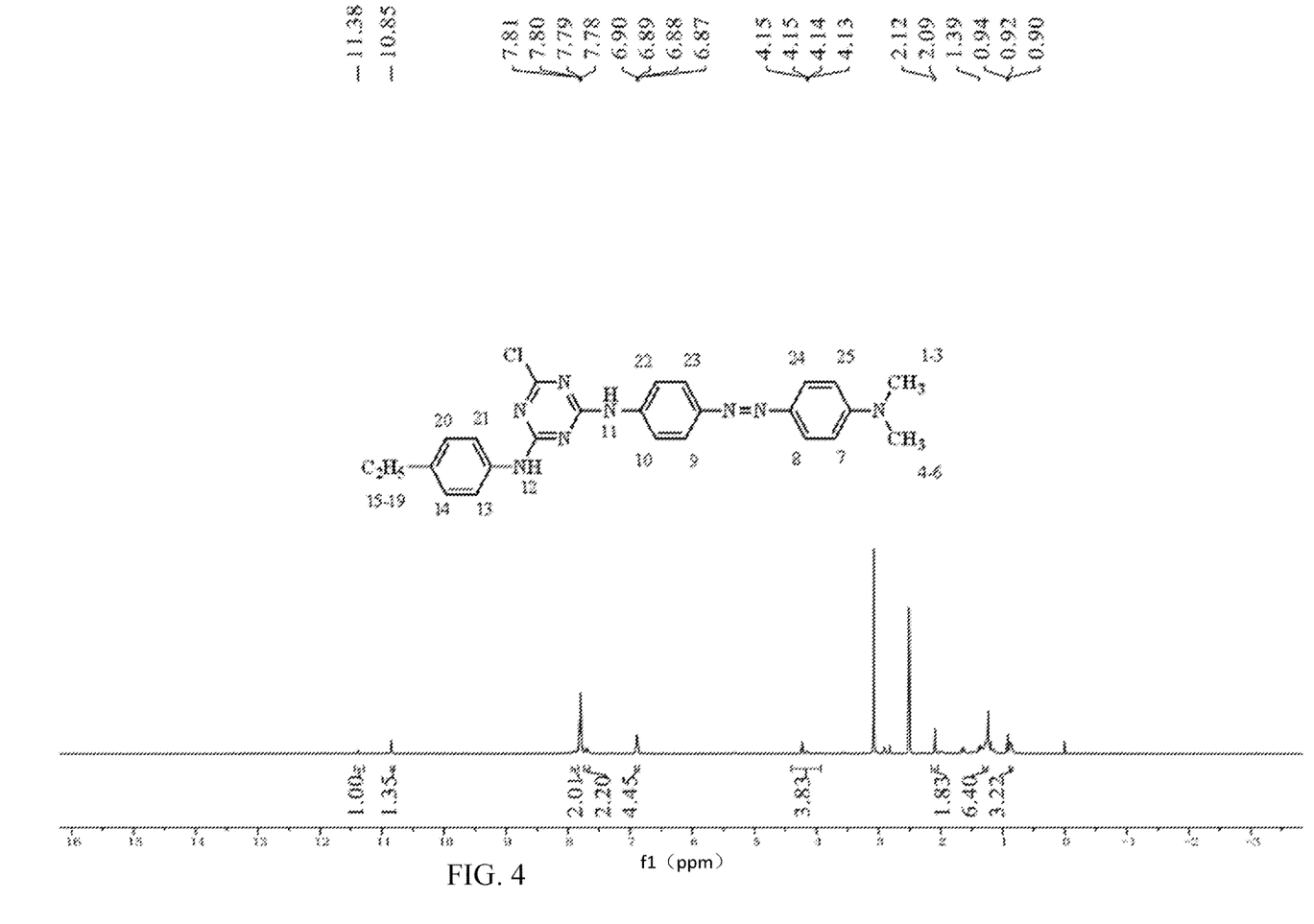
FIG. 4 shows a HNMR spectrum of the dye C.
Figure 5:
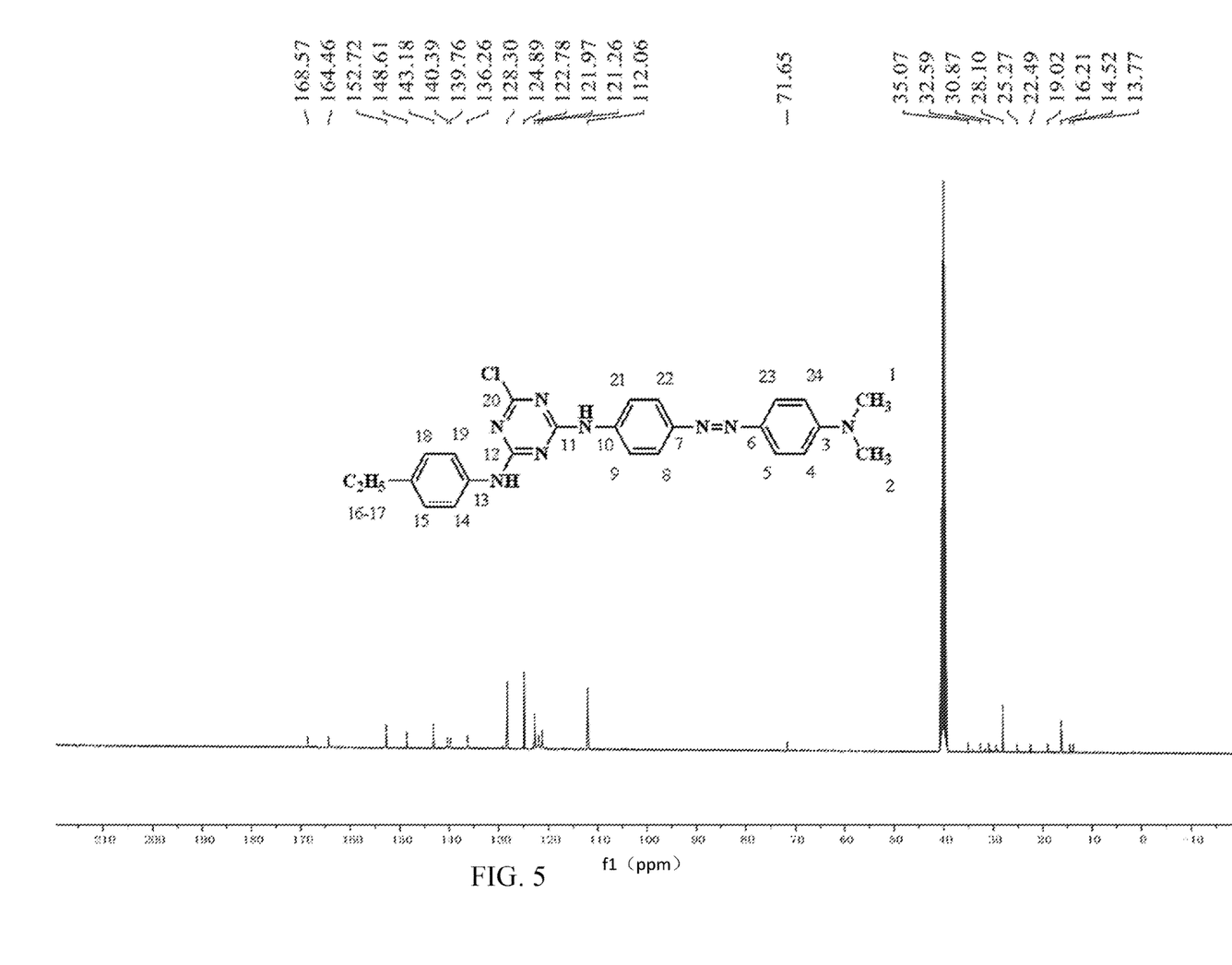
FIG. 5 shows a CNMR spectrum of the dye C.
Figure 6:
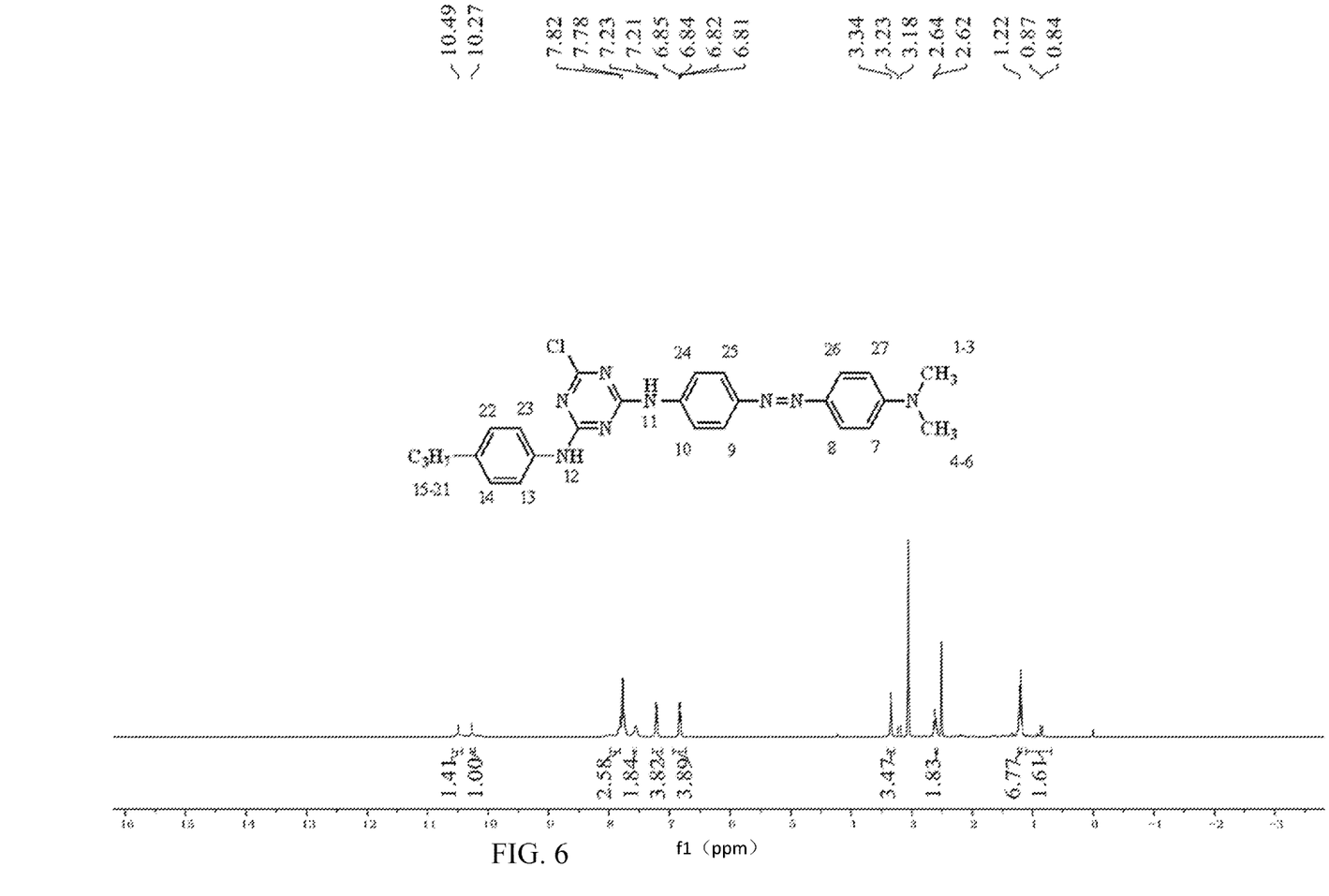
FIG. 6 shows a HNMR spectrum of the dye D.
Figure 7:
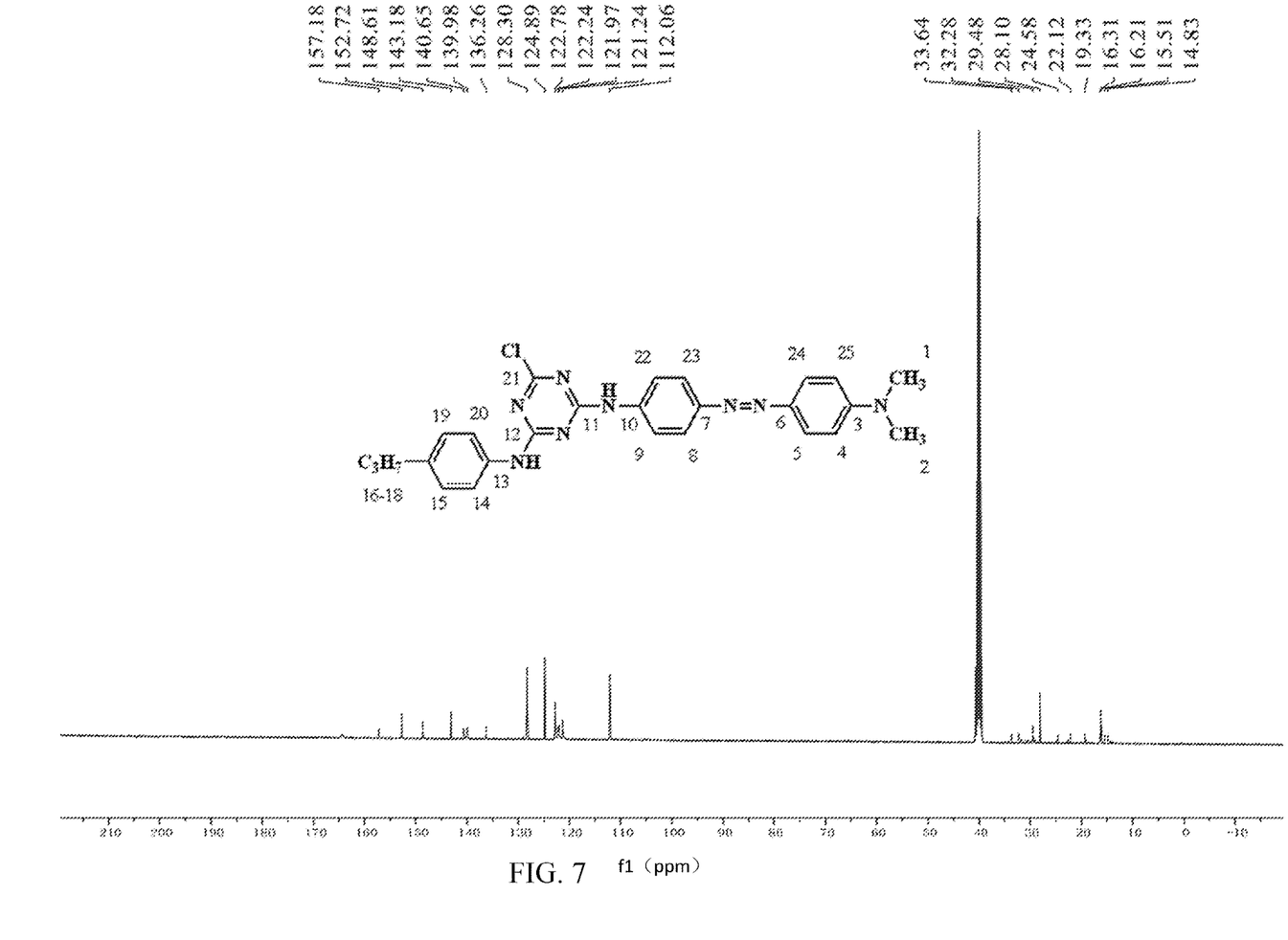
FIG. 7 shows a CNMR spectrum of the dye D.

As shown in FIG. 2 and FIG. 3, the synthesized two reactive disperse dyes (dye C and dye D) appears an out-of-plane bending vibration peak of C—H on the benzene ring at 600 to 900 $cm^{-1}$, an out-of-skeleton vibration peak of benzene ring at 1400-1600 $cm^{-1}$, a stretching vibration absorption peak of C—Cl at 800 $cm^{-1}$, and a stretching vibration absorption peak of —NH at 3440 $cm^{-1}$.

DETAILED DESCRIPTION OF PREFERRED EMBODIMENTS

The following non-limited embodiments enable those ordinary skilled in the art to understand the present disclosure more comprehensively, but do not limit the present disclosure in any way.

Embodiment 1

4-nitroaniline (0.02 mol, 2.76 g) was dissolved in 120 mL water, the mixed solution was heated to 75° C. and 8 mL of concentrated hydrochloric acid was added in the mixed solution to make its pH to 3 to 4. After complete dissolution of the 4-nitroaniline, the solution was continued to stir for 0.5 hours, and then was cooled down to 0 to 5° C. in an ice bath. Sodium nitrite (0.022 mol, 1.52 g) was dissolved in 20 mL water, and the mixture was quickly added into the above solution to react. After 2 hours of reaction, Erich reagent was used to check whether the diazotization reaction was completed. After completion of the reaction, a small amount of sulphamic acid was added to remove excessive sodium nitrite, and starch KI test paper was used to check until the starch KI test paper did not change color within 1 to 2 seconds, to obtain a p-nitroaniline diazonium salt solution.

N, N-dimethylaniline (0.02 mol, 1.42 g) and sodium carbonate (0.02 mol, 2.21 g) were dissolved in a mixed solution of 80 mL water and 20 mL methanol. 4-nitroaniline diazonium salt was dropwise added into the N, N-dimethylaniline mixed solution in an ice bath and the pH thereof was adjusted to 7 with a 10% (o.m.f) sodium carbonate solution, followed by reacting for 2.5 hours. A product was filtered to obtain a solid product. The solid product was dried in a vacuum drying oven at 60° C. for 24 hours to obtain a coupling dye parent (5.3 g).

The coupling dye parent (2.66 g, 0.02 mol) was dissolved in 120 mL ethanol with stirring at 75° C. Sodium sulfide nonahydrate (4.8 g, 0.02 mol) and sodium bicarbonate (1.76 g, 0.02 mol) were dissolved in 20 mL water to obtain a mixture. The mixture was dropwise added into the coupling dye parent solution to obtain a mixed solution to react with quick stirring for 4 hours. There was only one reduction product point by detecting the reaction with thin layer chromatography (TLC for short, toluene:ethyl acetate=14:3, and $R_f$=0.38). The reaction solution was cooled to room temperature and was conducted a vacuum filtration to obtain a N,N-dimethyl disperse dye (2.1 g).

N, N-dimethyl disperse dye (1.19 g, 0.005 mol) was dissolved in a mixed solution of 150 mL dioxane and 50 mL water. Cyanuric chloride (0.005 mol, 0.92 g) was dissolved in 50 mL dioxane and was dropwise added into the N, N-dimethyl disperse dye mixed solution, the pH thereof was adjusted to 7 with enough sodium carbonate, followed by reacting for 3 hours in an ice bath (0 to 5° C.). TLC (toluene:ethyl acetate=14:3 and $R_f$=0.38) was used to check the reaction endpoint. A reaction product was filtered and conducted a rotary evaporation, and the product was dried in a vacuum oven at 60° C. for 12 hours. The product was collected to recrystallize and purify with DMF to remove impurities, and 1.95 g of the dye A was obtained. The equation is as follows:

The dye A (0.002 mol, 0.75 g) was dissolved in a mixed solution of 150 mL dioxane and 50 mL water. 4-ethylaniline (0.268 g, 0.002 mol) was dissolved in 50 mL dioxane to obtain a mixture. The mixture was dropwise added into the dye A mixed solution and the pH thereof was adjusted to 7 with enough sodium carbonate, followed by reacting for 3 hours at 65° C. TLC (toluene:ethyl acetate=14:3 and $R_f$=0.38) was used to check the reaction endpoint. A reaction product was filtered and conducted a rotary evaporation, and the product was dried in a vacuum oven at 60° C. for 12 hours. The products were collected to recrystallize and purify with DMF to remove impurities, and 0.76 g of 2-chloro-4-ethylaniline-s-triazine reactive disperse dye (dye C) was obtained. The equation is as follows:

Dye A

Dye C

Embodiment 2

The synthesis method of the dye A refers to Embodiment 1.

The dye A (0.002 mol, 0.75 g) was dissolved in a mixed solution of 150 mL dioxane and 50 mL water. 4-propylaniline (0.268 g, 0.002 mol) was dissolved in 50 mL dioxane to obtain a mixture. The mixture was dropwise added into the dye A mixed solution and the pH thereof was adjusted to 7 with enough sodium carbonate, followed by reacting for 3 hours at 65° C. TLC (toluene:ethyl acetate=14:3 and $R_f$=0.38) was used to check the reaction endpoint. A reaction product was filtered and conducted a rotary evaporation, and the product was dried in a vacuum oven at 60° C. for 12 hours. The products were collected to recrystallize and purify with DMF to remove impurities, and 0.76 g of 2-chloro-4-propylaniline-s-triazine reactive disperse dye (dye D) was obtained. The equation is as follows:

Dye A

Dye C

Embodiment 3

A supercritical $CO_2$ anhydrous dyeing method for cotton fabrics: 2% (o.w.f) of dye C was added into a dye kettle and cotton fabric to-be-dyed was placed into a dyeing kettle. The cotton fabric to-be-dyed was dyed at 120° C. and 24 MPa for 60 minutes by using supercritical $CO_2$ fluid as the dyeing medium.

The K/S of the dyed cotton fabric is 6.8, and the color fastness to washing and the color fastness to rubbing are 4 to 5.

Embodiment 4

A supercritical $CO_2$ anhydrous dyeing method for cotton fabrics: 2% (o.w.f) of dye D was added into a dye kettle and cotton fabric to-be-dyed was placed into a dyeing kettle. The cotton fabric to-be-dyed was dyed at 100° C. and 24 MPa for 60 minutes by using the supercritical $CO_2$ fluid as the dyeing medium.

The K/S of the dyed cotton fabric is 5.7, and the color fastness to washing and the color fastness to rubbing are 4 to 5.

Embodiment 5

A supercritical $CO_2$ anhydrous dyeing method for wool fibers: 2% (o.w.f) of dye C was added into a dye kettle and wool fiber to-be-dyed was placed into a dyeing kettle. The wool fiber to-be-dyed was dyed at 100° C. and 24 MPa for 60 minutes by using supercritical $CO_2$ fluid as the dyeing medium.

The K/S of the dyed wool fiber is 4.2, and the color fastness to washing and the color fastness to rubbing are 4 to 5.

Embodiment 6

A supercritical $CO_2$ anhydrous dyeing method for wool fibers: 4% (o.w.f) of dye D was added into a dye kettle and wool fiber to-be-dyed was placed into a dyeing kettle. The wool fiber to-be-dyed was dyed at 100° C. and 24 MPa for 60 minutes by using supercritical $CO_2$ fluid as the dyeing medium.

The K/S of the dyed wool fiber is 5.3, and the color fastness to washing and the color fastness to rubbing are 4 to 5.

Embodiment 7

A supercritical $CO_2$ anhydrous dyeing method for polyester/cotton (65/35, mass ratio) fabrics: 2% (o.w.f) of dye C was added into a dye kettle and the fabric to-be-dyed was placed in a dyeing kettle. The fabric to-be-dyed was dyed at 100° C. and 24 MPa for 60 minutes by using supercritical $CO_2$ fluid as the dyeing medium.

The K/S of the dyed polyester/cotton fabric is 4.0, and the color fastness to washing and the color fastness to rubbing are 4 to 5.

Embodiment 8

A supercritical $CO_2$ anhydrous dyeing method for polyester/cotton (65/35, mass ratio) fabrics: 2% (o.w.f) of dye D was added into a dye kettle and the fabric to-be-dyed was placed into a dyeing kettle. The fabrics to-be-dyed was dyed at 100° C. and 24 MPa for 60 minutes by sing supercritical $CO_2$ fluid as the dyeing medium.

The K/S of the dyed polyester/cotton fabric is 5.8, and the color fastness to washing and the color fastness to rubbing are 4 to 5.

Embodiment 9

A supercritical $CO_2$ anhydrous dyeing method for polyester/cotton (50/50, mass ratio) fabrics: 4% (o.w.f) of dye D was added into a dye kettle and the fabric to-be-dyed was placed into a dyeing kettle. The fabric to-be-dyed was dyed at 130° C. and 24 MPa for 60 minutes by using the supercritical $CO_2$ fluid as the dyeing medium.

The K/S of the dyed polyester/cotton fabric was 6.3, and the color fastness to washing and the color fastness to rubbing are 4 to 5.

Embodiment 10

A supercritical $CO_2$ anhydrous dyeing method for polyester/cotton (50/50, mass ratio) fabrics: 2% (o.w.f) of dye D was added in a dye kettle and the fabric to-be-dyed, after pretreated with DMSO, was placed into a dyeing kettle, and the mangle expression was 80%. The fabric to-be-dyed was dyed at 120° C. and 25 MPa for 60 minutes by using supercritical $CO_2$ fluid as the dyeing medium.

The K/S of the dyed polyester/cotton fabric is 8.2, and the color fastness to washing and the color fastness to rubbing are 4 to 5.

Embodiment 11

A supercritical $CO_2$ anhydrous dyeing method for polyester/cotton (50/50, mass ratio) fabrics: 2% (o.w.f) of dye C was added into a dye kettle and and the fabric to-be-dyed was placed into a dyeing kettle. The fabric to-be-dyed was dyed at 120° C. and 22 MPa for 60 minutes by using supercritical $CO_2$ fluid as the dyeing medium.

The K/S of the dyed polyester/cotton fabric is 6.5, and the color fastness to washing and the color fastness to rubbing are 4 to 5.

It will be readily apparent to one skilled in the art that varying substitutions and modifications can be made to the invention disclosed herein without departing from the scope and spirit of the invention. Thus, such additional embodiments are within the scope of the present invention and the following claims. Therefore, any simple amendment, equivalent change and modification of the above embodiments according to the technical essence of the present disclosure, which is not separated from the content of the technical solution of the present disclosure, shall still fall within the scope of protection of the technical solution of the present disclosure.

The invention claimed is:

1. A reactive disperse yellow dye, having a structural according to formula I:

I wherein R is $C_2H_5$ or $C_3H_7$.

2. A method for preparing the reactive disperse yellow dye according to claim 1, comprising following steps of:

S1: dissolving N, N-dimethyl disperse dye II in a mixed solution of dioxane and water to obtain a N, N-dimethyl disperse dye II solution; dissolving cyanuric chloride in dioxane to obtain a mixture, followed by dropwise adding the mixture into the N, N-dimethyl disperse dye II solution, adjusting the solution's pH to 6 to 7 and conducting a reaction in an ice bath for 2 to 4 hours; after completion of the reaction, filtering a product, removing a solvent from the product, drying the product, and separating and purifying the product to obtain a N, N-dimethyl-s-triazine reactive disperse dye A, wherein the N, N-dimethyl disperse dye II has a structural according to formula II:

II the N, N-dimethyl-s-triazine reactive disperse dye A has a structural according to formula A:

Dye A

S2: dissolving the N, N-dimethyl-s-triazine reactive disperse dye A obtained in step S1 in a mixed solution of dioxane and water to obtain a N, N-dimethyl-s-triazine reactive disperse dye A solution; dissolving 4-ethylaniline or 4-propylaniline in dioxane to obtain a mixture, followed by dropwise adding the mixture into the N, N-dimethyl-s-triazine reactive disperse dye A solution, adjusting the solution's pH to 6 to 7 and conducting a reaction for 2.5 to 4.5 hours at 60 to 65° C.; after completion of the reaction, filtering a product, removing a solvent form the product, drying the product, and separating and purifying the product to obtain the reactive disperse yellow dye.

3. The method for preparing the reactive disperse yellow dye according to claim 1, wherein in step S1, a molar ratio of the N, N-dimethyl disperse dye II and the cyanuric chloride is 1:1 to 1:3; in step S2, a molar ratio of the N, N-dimethyl-s-triazine reactive disperse dye A and 4-ethylaniline or 4-propylaniline is 1:0.5 to 1:2.

4. The method for preparing the reactive disperse yellow dye according to claim 1, wherein in steps S1 and S2, a volume ratio of dioxane and water in the mixed solution of dioxane and water is 3:1; and the method for removing the solvent is rotary evaporation.

5. The method for preparing the reactive disperse yellow dye according to claim 1, wherein in steps S1 and S2, the drying is conducted at 60 to 80° C. for 12 hours.

6. The method for preparing the reactive disperse yellow dye according to claim 1, wherein in steps S1 and S2, sodium carbonate is used to adjust the pH to 7; and the separation and purification is to recrystallize the product by N, N-dimethylformamide.

7. A method for anhydrous dyeing, comprising dispersing the reactive disperse yellow dye in a supercritical $CO_2$ fluid to form a dyeing medium; and dying a textile using the dyeing medium.

8. The method according to claim 7, further comprising adding 1 to 4% (o.w.f) of the reactive dispersive yellow dye and the supercritical $CO_2$ fluid into a dye kettle; and placing the textile in the dyeing kettle to dye for 40 to 120 minutes at 80 to 140° C. under 16 to 26 MPa.

9. The method according to claim 7, wherein the textile is selected from cellulose fiber, protein fiber, chemical fiber, and a blended fabric thereof.

10. The method according to claim 9, wherein the cellulose fiber is cotton fiber or fibrilia, the protein fiber is wool fiber, and the chemical fiber is polyester, and the blended fabric is cotton-polyester blended fabric.

* * * * *